(12) United States Patent
He

(10) Patent No.: US 10,686,903 B2
(45) Date of Patent: Jun. 16, 2020

(54) INFORMATION PUSH METHOD AND ELECTRONIC DEVICE

(71) Applicant: BEIJING KINGSOFT INTERNET SECURITY SOFTWARE CO., LTD., Beijing (CN)

(72) Inventor: Lu He, Beijing (CN)

(73) Assignee: BEIJING KINGSOFT INTERNET SECURITY SOFTWARE CO., LTD., Beijing (CN)

( * ) Notice: Subject to any disclaimer, the term of this patent is extended or adjusted under 35 U.S.C. 154(b) by 248 days.

(21) Appl. No.: 15/762,012

(22) PCT Filed: Aug. 15, 2016

(86) PCT No.: PCT/CN2016/095331
§ 371 (c)(1),
(2) Date: Mar. 21, 2018

(87) PCT Pub. No.: WO2017/054582
PCT Pub. Date: Apr. 6, 2017

(65) Prior Publication Data
US 2018/0278704 A1    Sep. 27, 2018

(30) Foreign Application Priority Data
Sep. 30, 2015    (CN) .......................... 2015 1 0641114

(51) Int. Cl.
*H04L 29/08*    (2006.01)
*G06F 16/9535*    (2019.01)
*G06Q 30/02*    (2012.01)

(52) U.S. Cl.
CPC .......... *H04L 67/26* (2013.01); *G06F 16/9535* (2019.01); *G06Q 30/0263* (2013.01)

(58) Field of Classification Search
CPC ... H04L 67/26; G06F 16/9535; G06F 16/951; G06Q 30/0263
See application file for complete search history.

(56) References Cited

U.S. PATENT DOCUMENTS

| 2004/0054577 A1* | 3/2004 | Inoue | ..................... G06Q 30/02 705/14.56 |
| 2014/0279070 A1 | 9/2014 | Ramakrishnan et al. | |

(Continued)

FOREIGN PATENT DOCUMENTS

| CN | 103077469 | 5/2013 |
| CN | 103207876 | 7/2013 |

(Continued)

OTHER PUBLICATIONS

English translation of the ISR/WO for PCT Application CN2016095331, Nov. 14, 2016.

(Continued)

*Primary Examiner* — Caroline H Jahnige
(74) *Attorney, Agent, or Firm* — Hodgson Russ LLP

(57) ABSTRACT

Disclosed is an information push method and an electronic device. The method includes: acquiring a page view number of each piece of information in a predetermined information list for a predetermined period of time before a current time; selecting information from the predetermined information list according to the page view number, wherein the selected information is information not meeting a predetermined information displaying condition; acquiring an information recommendation degree of the selected information; determining information to be pushed from the selected information according to the information recommendation degree; and pushing the information to be pushed.

16 Claims, 3 Drawing Sheets

(56) References Cited

U.S. PATENT DOCUMENTS

2016/0300265 A1* 10/2016 Goyal ................ G06Q 30/0257
2018/0232257 A1*  8/2018 Liu ..................... G06F 9/5066

FOREIGN PATENT DOCUMENTS

| CN | 103678672 | 3/2014 |
| CN | 103714474 | 4/2014 |
| CN | 104834731 | 8/2015 |
| CN | 105183904 | 12/2015 |

OTHER PUBLICATIONS

SIPO, Office Action for CN App. No. 201510641114, dated Jan. 26, 2018.

* cited by examiner

INFORMATION PUSH METHOD AND ELECTRONIC DEVICE

CROSS REFERENCE TO RELATED APPLICATION

This application is a U.S. national phase application of International Application PCT/CN2016/095331, filed Aug. 15, 2016, which claims priority to and benefits of Chinese Patent Application Serial No. 201510641114.9, filed with the State Intellectual Property Office of P. R. China on Sep. 30, 2015, the entire contents of which are incorporated herein by reference.

FIELD

The present disclosure relates to an internet technology field, and more particularly to an information push method and an electronic device.

BACKGROUND

Since Internet is more and more popular, network users are gradually increased, and on this basis, network advertisement is chosen by more and more companies. For network operators, this not only can greatly increase benefits, but also can provide users with a new manner for acquiring information.

It should be understood that during a process of pushing advertisements to the users through the Internet, there are always new advertisements provided by new companies and expired advertisements provided by old companies.

In practice, when the advertisements are pushed to the users by the network operators, advertisements to be pushed are determined not only according to the old advertisements provided by the old companies, but also according to new advertisements provided by the new companies. Commonly, different strategies are used in the above two conditions. Specifically, for the old advertisements, the advertisements to be pushed may be determined by historical push information of the old advertisements. However, for the new advertisements, the advertisements to be pushed are typically determined by randomly selecting from the new advertisements provided by the new companies since there is no or little historical push information related to the new advertisements.

The advertisements to be pushed may be determined from the new advertisements provided by the new companies as described above, thus accumulating the historical push information of the advertisements newly provided. However, the random selecting manner shows no consideration about the users' feelings, which may lead to bad user experience.

SUMMARY

Embodiments of the present disclosure provide an information push method and an electronic device.

Accordingly, in embodiments of a first aspect of the present disclosure, the information push method is provided, including:

acquiring a page view number of each piece of information in a predetermined information list for a predetermined period of time before a current time;

selecting information from the predetermined information list according to the page view number, wherein the selected information is information not meeting a predetermined information displaying condition;

acquiring an information recommendation degree of the selected information;

determining information to be pushed from the selected information according to the information recommendation degree;

pushing the information to be pushed.

In an embodiment of the present disclosure, the step of acquiring a page view number of each piece of information in a predetermined information list for a predetermined period of time before a current time includes:

acquiring a page view number $PV_{ADi}$ of any information $AD_i$ in a predetermined information list for a predetermined period of time before the current time according to a formula of $$PV_{ADi} = w_1 * PV_{ADi\_f1} + \ldots + w_n * PV_{ADi\_fn},$$

where $PV_{ADi\_f1}$ represents a page view number of the information $AD_i$ for a first day before the current time, $w_1$ represents an attenuation coefficient corresponding to $PV_{ADi\_f1}$, $PV_{ADi\_fn}$ represents a page view number of the information $AD_i$ for a $n^{st}$ day before the current time, $w_n$ represents an attenuation coefficient corresponding to $PV_{ADi\_fn}$, the $n^{st}$ day before the current time is a day most far from the current time which is determined according to the predetermined period of time, and values from $w_1$ to $w_n$ are decreased progressively according to a predetermined rule.

In an embodiment of the present disclosure, the step of selecting information from the predetermined information list according to the page view number includes:

adjusting the page view number according to a formula of $$P'_{ADj\_1} = (target\_pv - P_{ADj1})/target\_pv,$$

where $P_{ADj1}$ represents a page view number of the information $AD_j$, $P'_{ADj\_1}$ represents an adjusted page view number corresponding to $P_{ADj1}$, and $target\_pv$ represents a predetermined threshold of a page view number;

selecting information having a page view number greater than a first probability threshold and smaller than a second probability threshold from the predetermined information list.

In an embodiment of the present disclosure, the step of determining information to be pushed in the selected information according to the information recommendation degree includes:

adjusting the information recommendation degree according to a formula of $$P_{ADq2}' = P_{ADq2} - P_{min}/(P_{max} - P_{min})$$

where $P_{ADq2}$ represents an information recommendation degree of information $ADq$, $P'_{ADq\_2}$ represents an adjusted information recommendation degree corresponding to $P_{ADq2}$, $P_{min}$ represents a minimal information recommendation degree in the information recommendation degrees, and $P_{max}$ represents a maximal information recommendation degree in the information recommendation degrees;

determining information to be pushed from information having an adjusted information recommendation degree meeting a predetermined second information selecting condition of the selected information.

In an embodiment of the present disclosure, the step of determining information to be pushed from information having an adjusted information recommendation degree meeting a second information selecting condition of the selected information includes:

searching for information having an adjusted information recommendation degree greater than a first recommendation degree threshold and smaller than or equal to a second recommendation degree threshold from the selected information;

calculating a selecting weight of any found information according to a formula of $$P_{ADr}=w_{r1}*P_{ADr1}+w_{r2}*P_{ADr2},$$

where $P_{ADr}$ represents a selecting weight of information $ADr$, $P_{ADr1}$ represents an adjusted page view number of information ADr, $P_{ADr2}$ represents an adjusted information recommendation degree of information ADr, $w_{r1}$ and $w_{r2}$ represent selecting weights of $P_{ADr1}$ and $P_{ADr2}$ respectively, and $w_{r1}+w_{r2}=1$;

determining information to be pushed from information having a selecting weight meeting a predetermined third information selecting condition of the found information.

In an embodiment of the present disclosure, the step of determining information to be pushed from information having a selecting weight meeting a predetermined third information selecting condition of the found information includes:

acquiring a random number according to a predetermined range and a predetermined random function;

determining the information to be pushed from the information having the selecting weight meeting the predetermined third information selecting condition of the found information according to the random number.

In embodiments of a second aspect of the present disclosure, the electronic device is provided, including a housing, a processor, a memory, an circuit board and a power circuit, in which the circuit board is disposed within a space enclosed by the housing, the processor and the memory are disposed on the circuit board, the power circuit is configured to supply power to respective circuits or components of the electronic device, the memory is configured to store an executable program code, the processor is configured to read the executable program code stored in the memory to run a program corresponding to the executable program code, so as to be configured to perform following steps:

acquiring a page view number of each piece of information in a predetermined information list for a predetermined period of time before a current time;

selecting information from the predetermined information list according to the page view number, wherein the selected information is information not meeting a predetermined information displaying condition;

acquiring an information recommendation degree of the selected information;

determining information to be pushed from the selected information according to the information recommendation degree;

pushing the information to be pushed.

In embodiments of the present disclosure, a computer readable storage medium is provided, having stored therein instructions that, when executed by a processor of an electronic device, causes the electronic device to perform the information push method described above.

BRIEF DESCRIPTION OF THE DRAWINGS

In order to more clearly illustrate the technical solutions in embodiments of the present disclosure, the drawings intended to be used in the embodiments are briefly described below. It will be apparent that the drawings in the following description are merely exemplary embodiments of the present invention. Those skilled in the art will be able to obtain additional drawings in accordance with these drawings without any inventive work.

DETAILED DESCRIPTION

Embodiments of the present disclosure will be described in details in the following descriptions, and it will be apparent that the described embodiments are only part of the embodiments of the present disclosure. All other embodiments which can be obtained by those skilled in the art without making any inventive work based on embodiments described in the present disclosure are within the scope of the present disclosure.

Figure 1:
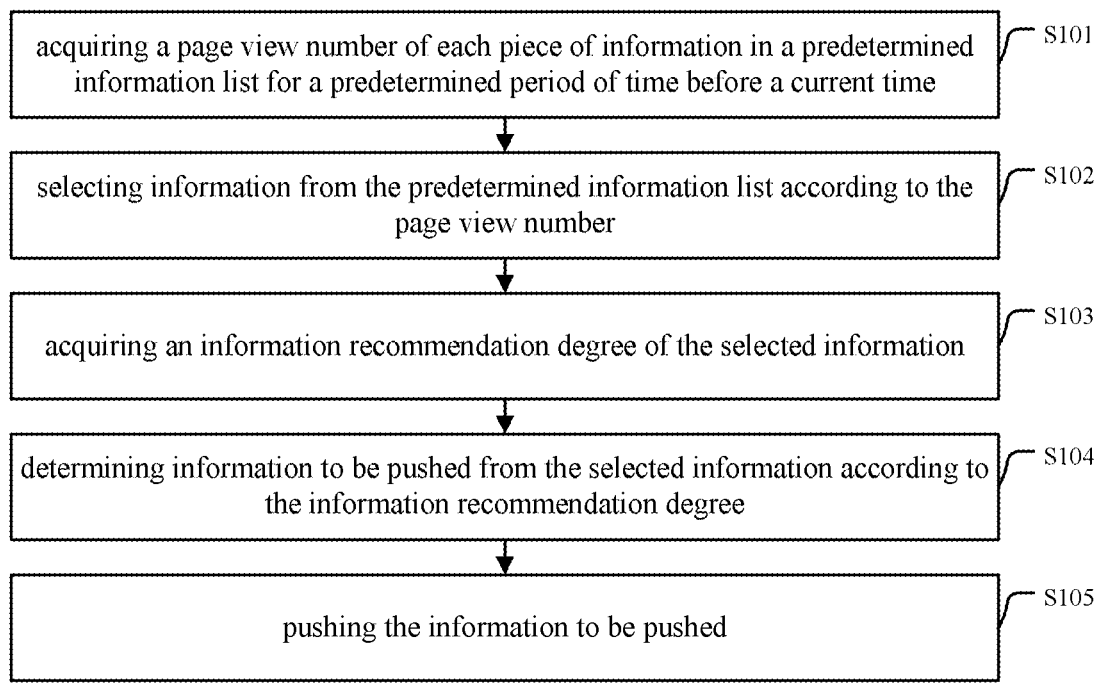
FIG. 1 is a flow chart of an information push method according to an embodiment of the present disclosure.

FIG. 1 is a flow chart of an information push method according to an embodiment of the present disclosure. The information push method may include following steps.

At step S101, a page view number of each piece of information in a predetermined information list for a predetermined period of time before a current time is acquired.

The predetermined information list is configured to store identifications of the information, such as advertisements, news, and weather reports, which are not limited in the present disclosure.

The predetermined period of time may be a time period having a unit of hours, such as 12 hours and 6 hours, or a time period having a unit of days, such as 15 days and 20 days.

The page view number is a primary indicator to evaluate a network news channel or a website, or even online news, and it is one of the most commonly used indicators for evaluating data traffic of the website.

In the above step, there may be at least one of page view numbers corresponding to each piece of information. For example, the page view number of the information may be acquired daily, such that the information may have a plurality of the page view numbers in the predetermined period of time.

At step S102, information is selected from the predetermined information list according to the page view number.

In an embodiment of the present disclosure, the selected information is information not meeting a predetermined information displaying condition. Specifically, the predetermined information displaying condition may be an information display condition related to the page view number. For example, if the page view number of the information is smaller than a certain threshold, the information is the information to be selected.

It should be understood by one skilled in the art that, the page view number of a piece of information in the predetermined period of time is usually related to a previous one. However, the relationship between the above two page view numbers will be less related as a time interval between two periods of time in which the two numbers are acquired respectively. For example, an absolute value of a difference between page view numbers of today and yesterday of an advertisement may be smaller than an absolute value of a difference between the page view numbers of today and the day before yesterday of the advertisement. For the above reason, it may be determined whether a piece of information is the information to be selected according to the page view number.

For example, if a piece of information has never been displayed before, such information may be the information to be selected, or if a page view number of a piece of information is gradually increased from 0, such information may be the information to be selected, or if a page view number of a piece of information is gradually decreased, such information may not be the information to be selected.

At step S103, an information recommendation degree of the selected information is acquired.

Specifically, an information recommendation degree of a piece of information may be a popularity degree of the piece of information which is obtained by an operation and maintenance staff through questionnaires or other forms of investigations before the information is delivered. The popularity degree may also be predicted according to an information type and other historical data. The information recommendation degree may also be price information, for example, effective cost per mille (eCPM).

At step S104, information to be pushed is determined from the selected information according to the information recommendation degree.

Since the information recommendation degree may have an effect on the user experience or income of an operator, the information to be pushed is thus determined according to the information recommendation degree.

For example, if the information recommendation degree is the popularity degree, information with a higher popularity degree may be determined from the selected information to be the information to be pushed.

If the information recommendation degree is the price information, information with a higher price may be determined from the selected information to be the information to be pushed.

Alternatively, the information recommendation degree may be a combination of the popularity degree and the price information. The information to be pushed may be determined according to several factors.

At step S105, the information to be pushed is pushed.

In an embodiment of the present disclosure, when the page view number of each piece of information in a predetermined information list for a predetermined period of time before a current time is acquired, a page view number $PV_{ADi}$ of any information $AD_i$ in a predetermined information list for a predetermined period of time before the current time may be acquired according to a formula of $$PV_{ADi}=w_1*PV_{ADi\_f1}+\ldots+w_n*PV_{ADi\_fn},$$

where $PV_{ADi\_f1}$ represents a page view number of the information $AD_i$ for a first day before the current time, $w_1$ represents an attenuation coefficient corresponding to $PV_{ADi\_f1}$, $PV_{ADi\_fn}$ represents a page view number of the information $AD_i$ for a $n^{st}$ day before the current time, $w_n$ represents an attenuation coefficient corresponding to $PV_{ADi\_fn}$, the $n^{st}$ day before the current time is a day most far from the current time which is determined according to the predetermined period of time, and values from $w_1$ to $w_n$ are decreased progressively according to a predetermined rule.

Specifically, if the predetermined period of time is 120 hours, n=120/24=5.

Figure 2:
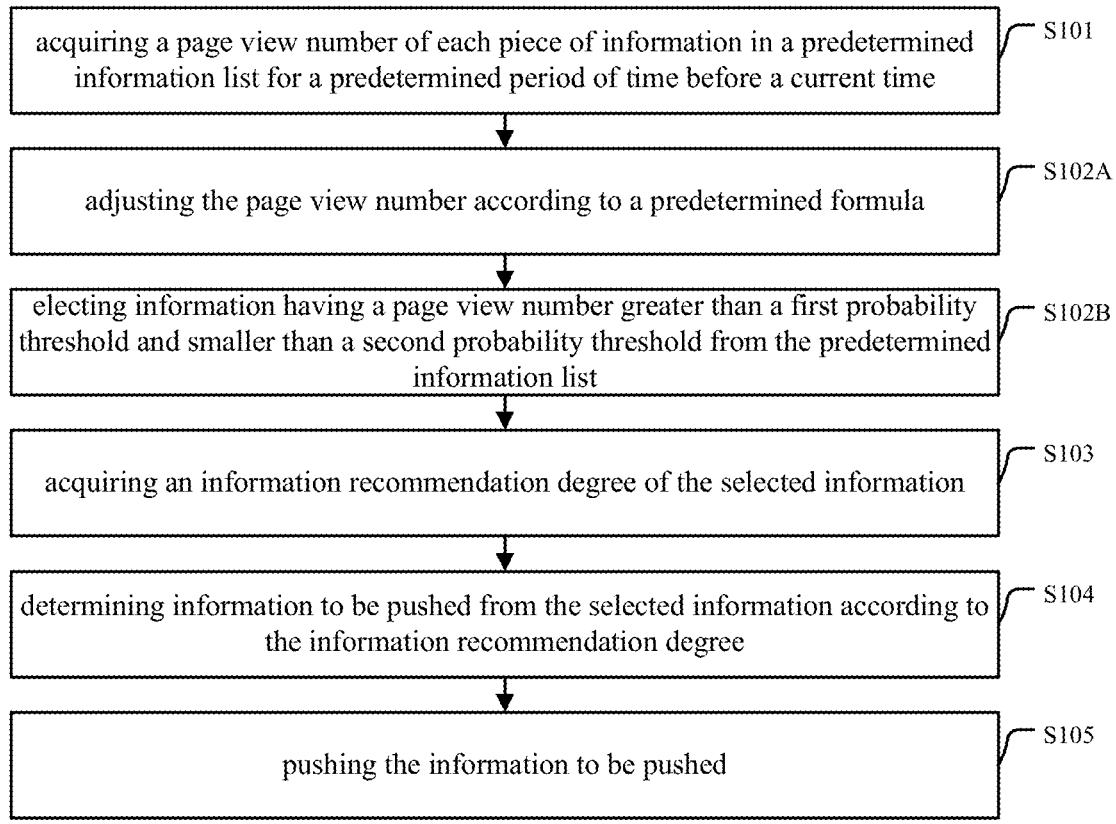
FIG. 2 is a flow chart of another information push method according to an embodiment of the present disclosure.

In an embodiment of the present disclosure, as shown in FIG. 2, a flow chart of another information push method is provided. Compared to the embodiment described above, in this embodiment, the step of selecting information from the predetermined information list according to the page view number (S102) may include following steps.

At step S102A, the page view number is adjusted according to a predetermined formula.

The predetermined formula may specially be $$P'_{ADj\ 1}=(\text{target\_pv}-P_{ADj1})/\text{target\_pv}.$$

Specifically, $P_{ADj1}$ represents a page view number of the information $AD_i$, $P'_{ADj\ 1}$ represents an adjusted page view number corresponding to $P_{ADj1}$, and target_pv represents a predetermined threshold of a page view number.

It should be understood that, if target_pv is smaller than or equal to $P_{ADj1}$, the page view number of the information $AD_i$ is high. On this basis, it can be generally determined that the information $AD_i$ is not the information to be selected. Otherwise, if target_pv is greater than $P_{ADj1}$, the page view number of the information $AD_i$ is not high, and thus it can be determined that the information $AD_i$ is the information to be selected.

At step S102B, information having a page view number greater than a first probability threshold and smaller than a second probability threshold is selected from the predetermined information list.

Alternatively, the first probability threshold may be 0 and the second probability threshold may be 1.

In an embodiment of the present disclosure, when the information to be pushed is determined in the selected information according to the information recommendation degree, the information recommendation degree may be adjusted according to a following formula, information to be pushed is determined from information having an adjusted information recommendation degree meeting a predetermined second information selecting condition of the selected information. The formula is as follows:

$$P_{ADq2}'=P_{ADq2}-P_{min})/(P_{max}-P_{min})$$

where $P_{ADq2}$ represents an information recommendation degree of information $AD_q$, $P'_{ADq\ 2}$ represents an adjusted information recommendation degree corresponding to $P_{ADq2}$, $P_{min}$ represents a minimal information recommendation degree in the information recommendation degrees, and $P_{max}$ represents a maximal information recommendation degree in the information recommendation degrees.

As described above, a first information selecting condition may be selecting information having a page view number greater than a first probability threshold and smaller than and equal to a second probability threshold from the predetermined information list. A second information selecting condition may be the same as the first information selecting condition, moreover, the second information selecting condition may also be selecting information having a adjusted information recommendation degree greater than a third threshold from the selected information. The information selecting conditions are not limited in the present disclosure.

Specifically, when the information to be pushed is determined, the page view number of the information may also be considered besides the information recommendation degree of the information. In an alternative embodiment of the present disclosure, when the information to be pushed is determined from information having an adjusted information recommendation degree meeting a second information selecting condition of the selected information, information having an adjusted information recommendation degree greater than a first recommendation degree threshold and smaller than or equal to a second recommendation degree threshold may be first to be searched for from the selected information, and then a selecting weight of any found information is calculated according to a formula below, and information to be pushed is determined from information having a selecting weight meeting a predetermined third information selecting condition of the found information. The formula is as follows:

$$P_{ADr}=w_{r1}*P_{ADr1}+w_{r2}*P_{ADr2},$$

where $P_{ADr}$ represents a selecting weight of information $AD_r$, $P_{ADr1}$ represents an adjusted page view number of information ADr, $P_{ADr2}$ represents an adjusted information recommendation degree of information ADr, $w_{r1}$ and $w_{r2}$ represent selecting weights of $P_{ADr1}$ and $P_{ADr2}$ respectively, and $w_{r1}+w_{r2}=1$.

Specifically, if $w_{r1}$ is smaller than $w_{r2}$, information having a high information recommendation degree is first to be pushed, for example, an advertisement having a high price is first to be pushed. If $w_{r1}$ is greater than $w_{r2}$, information having a high page view number is first to be pushed.

In an embodiment of the present disclosure, since the selecting weight of original information which meets the predetermined information displaying condition is normally calculated to be high, in order to reduce error and to better determine the information to be pushed, the selecting weight of any found information may be calculated and the information may be searched for again, according to a predetermined selecting weight threshold. For example, information having a selecting weight greater than the first selecting threshold and smaller than or equal to a second selecting threshold is searched for from the found information, and then subsequent steps for determining the information to be pushed may be performed.

In an embodiment of the present disclosure, the first selecting weight predetermined is 0 and the second selecting weight predetermined is 100.

Alternatively, information may have a low probability for being displayed due to an over small selecting weight of the information. In order to prevent such a case from happening, in practice, after the selecting weight of any information is calculated, it is determined whether the selecting weight is smaller than a third selecting weight threshold. If the selecting weight is smaller than the third selecting weight, the selecting weight is used as a predetermined third selecting weight. In an embodiment of the present disclosure, the predetermined third selecting weight is 20.

Alternatively, the first recommendation degree threshold is predetermined to be 0 and the second recommendation degree threshold is predetermined to be 1.

In an alternative embodiment of the present disclosure, when the information to be pushed is determined from information having the selecting weight meeting the predetermined third information selecting condition of the found information, a random number may be acquired according to a predetermined range and a predetermined random function, and the information to be pushed is determined from the information having the selecting weight meeting the predetermined third information selecting condition of the found information according to the random number.

Specifically, a random number may be selected from a range of (0, 100] according to the random function, and information having the selecting weight greater than or equal to the random number is searched for and used as the information to be pushed.

According to embodiments of the present disclosure, after the page view number of each piece of information in the predetermined information list for the predetermined period of time before the current time is acquired, information is selected from the predetermined information list according to the page view number, the information recommendation degree of the selected information is acquired, information to be pushed is determined from the selected information according to the information recommendation degree, and the information to be pushed is pushed. Accordingly, information is pushed according to the information recommendation degree in embodiments of the present disclosure instead of a random selection manner, thus improving the user experience.

An information push apparatus corresponding to above information push method is provided in embodiments of the present disclosure.

Figure 3:
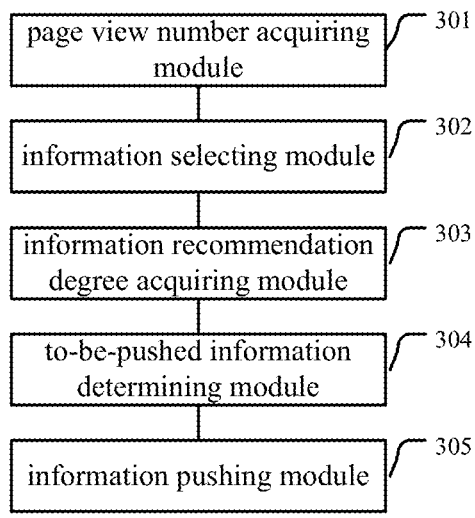
FIG. 3 is a schematic diagram of an information push apparatus according to an embodiment of the present disclosure.

FIG. 3 is a schematic diagram of an information push apparatus according to an embodiment of the present disclosure, and the information push apparatus include:

a page view number acquiring module 301 configured to acquire a page view number of each piece of information in a predetermined information list for a predetermined period of time before a current time;

an information selecting module 302 configured to select information from the predetermined information list according to the page view number, wherein the selected information is information not meeting a predetermined information displaying condition;

an information recommendation degree acquiring module 303 configured to acquire an information recommendation degree of the selected information;

a to-be-pushed information determining module 304 configured to determine information to be pushed from the selected information according to the information recommendation degree;

an information pushing module 305 configured to push the information to be pushed.

Alternatively, the page view number acquiring module 301 is specially configured to:

acquire a page view number $PV_{ADi}$ of any information $AD_i$ in a predetermined information list for a predetermined period of time before the current time according to a formula of $$PV_{ADi}=w_1*PV_{ADi\_f1}+\ldots+w_n*PV_{ADi\_fn},$$

where $PV_{ADi\_f1}$ represents a page view number of the information $AD_i$ for a first day before the current time, $w_1$ represents an attenuation coefficient corresponding to $PV_{ADi\_f1}$, $PV_{ADi\_fn}$ represents a page view number of the information $AD_i$ for a $n^{st}$ day before the current time, $w_n$ represents an attenuation coefficient corresponding to $PV_{ADi\_fn}$, the $n^{st}$ day before the current time is a day most far from the current time which is determined according to the predetermined period of time, and values from $w_1$ to $w_n$ are decreased progressively according to a predetermined rule.

Figure 4:
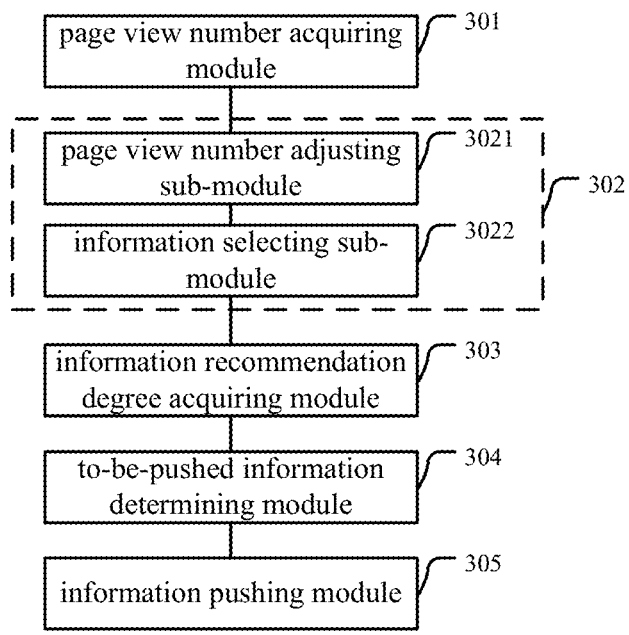
FIG. 4 is a schematic diagram of another information push apparatus according to an embodiment of the present disclosure.

In a specific embodiment of the present disclosure, as shown in FIG. 4, a schematic diagram of another information push apparatus is provided. Compared with above embodiment, the information selecting module 302 of the present disclosure includes:

a page view number adjusting sub-module 3021 configured to adjust the page view number according to a formula of $$P'_{ADj\ 1}=(target\_pv-P_{ADj1})/target\_pv.$$

where $P_{ADj1}$ represents a page view number of the information $AD_j$, $P'_{ADj\,1}$ represents an adjusted page view number corresponding to $P_{ADj1}$, and target_pv represents a predetermined threshold of a page view number;

an information selecting sub-module 3022 configured to select information having a first page view number greater than a first probability threshold and smaller than or equal to a second probability threshold from the predetermined information list.

Specifically, the to-be-pushed information determining module 304 includes:

an information recommendation degree adjusting sub-module configured to adjust the information recommendation degree according to a formula of $$P_{ADq2}'=P_{ADq2}-P_{min})/(P_{max}-P_{min})$$

where $P_{ADq2}$ represents an information recommendation degree of information ADq, $P'_{ADq\,2}$ represents an adjusted information recommendation degree corresponding to $P_{ADq2}$, $P_{min}$ represents a minimal information recommendation degree in the information recommendation degrees, and $P_{max}$ represents a maximal information recommendation degree in the information recommendation degrees;

a to-be-pushed information determining sub-module configured to determine information to be pushed from information having an adjusted information recommendation degree meeting a predetermined second information selecting condition of the selected information.

Specifically, the to-be-pushed information determining sub-module includes:

an information searching unit configured to search for information having an adjusted information recommendation degree greater than a first recommendation degree threshold and smaller than or equal to a second recommendation degree threshold from the selected information;

a selecting weight calculating unit configured to calculate a selecting weight of any found information according to a formula of $$P_{ADr}=w_{r1}*P_{ADr1}+w_{r2}*P_{ADr2},$$

where $P_{ADr}$ represents a selecting weight of information $AD_r$, $P_{ADr1}$ represents an adjusted page view number of information ADr, $P_{ADr2}$ represents an adjusted information recommendation degree of information ADr, $w_{r1}$ and $w_{r2}$ represent selecting weights of $P_{ADr1}$ and $P_{ADr2}$ respectively, and $w_{r1}+w_{r2}=1$;

a to-be-pushed information determining unit configured to determine information to be pushed from information having a selecting weight meeting a predetermined third information selecting condition of the found information.

Specifically, the to-be-pushed information determining unit includes:

a random number acquiring sub-unit configured to acquire a random number according to a predetermined range and a predetermined random function;

a to-be-pushed information determining sub-unit configured to determine the information to be pushed from the information having the selecting weight meeting the predetermined third information selecting condition of the found information according to the random number.

According to embodiments of the present disclosure, after the page view number of each piece of information in the predetermined information list for the predetermined period of time before the current time is acquired, information is selected from the predetermined information list according to the page view number, the information recommendation degree of the selected information is acquired, information to be pushed is determined from the selected information according to the information recommendation degree, and the information to be pushed is pushed. Accordingly, information is pushed according to the information recommendation degree in embodiments of the present disclosure instead of a random selection manner, thus improving the user experience.

Corresponding to the information push method and apparatus described above, an electronic device is also provided in embodiments of the present disclosure.

Figure 5:
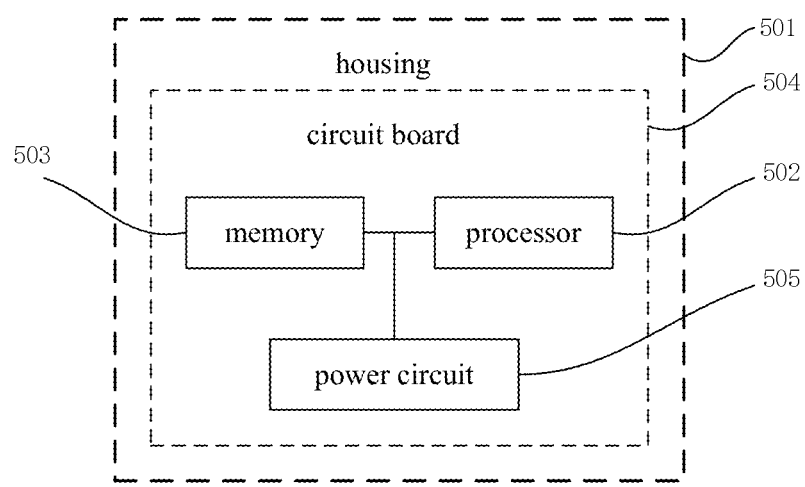
FIG. 5 is a schematic diagram of an electronic device according to an embodiment of the present disclosure.

FIG. 5 is a schematic diagram of an electronic device according to an embodiment of the present disclosure. The electronic device includes a housing 501, a processor 502, a memory 503, a circuit board 504 and a power circuit 505, wherein the circuit board 504 is disposed within a space enclosed by the housing 501, the processor 502 and the memory 503 are disposed on the circuit board 504, the power circuit 505 is configured to supply power to respective circuits or components of the electronic device, the memory 503 is configured to store an executable program code, the processor 502 is configured to read the executable program code stored in the memory 503 to run a program corresponding to the executable program code, so as to be configured to perform following steps:

acquiring a page view number of each piece of information in a predetermined information list for a predetermined period of time before a current time;

selecting information from the predetermined information list according to the page view number, wherein the selected information is information not meeting a predetermined information displaying condition;

acquiring an information recommendation degree of the selected information;

determining information to be pushed from the selected information according to the information recommendation degree;

pushing the information to be pushed.

A specific process of above steps performed by the processor 502 and steps performed by the processor 502 through running the executable program code may be referred to the embodiments shown in FIGS. 1 to 4, which are not described in detail here.

According to embodiments of the present disclosure, after the page view number of each piece of information in the predetermined information list for the predetermined period of time before the current time is acquired, information is selected from the predetermined information list according to the page view number, the information recommendation degree of the selected information is acquired, information to be pushed is determined from the selected information according to the information recommendation degree, and the information to be pushed is pushed.

Accordingly, information is pushed according to the information recommendation degree in embodiments of the present disclosure instead of a random selection manner, thus improving the user experience.

The electronic device may be present in a variety of forms, including but not being limited to devices as follows:

(1) Mobile communication device: this kind of device is characterized by a mobile communication function, so as to provide voice and data communications, and such a device includes terminals such as a smart phone (e.g., iPhone), a multimedia phone, a functional phone, and a low-end mobile phone.

(2) Ultra-mobile personal computer device: this kind of device belongs to a personal computer category, having computing and processing functions, generally also having mobile networking functions, and such a device includes terminals such as a personal digital assistant (PDA), a mobile internet device (MID) and an ultra mobile personal computer (UMPC), e.g., iPad.

(3) Portable entertainment device: this kind of device may display and play multimedia content, and such a device includes: audio and video players (such as iPod), a handheld game console, an e-book, a smart toy and a portable car navigation equipment.

(4) Server: a server may provide a computing service device, including a processor, a hard disk, a memory and a system bus, and the server may have an architecture similar to a general computer architecture, however, the server may require higher processing ability, stability, reliability, security, scalability and manageability since the server is required to provide highly reliable services.

(5) Other electronic devices with a data exchanging function.

For the embodiments of apparatus and the electronic device, reference may be made to the embodiments of the method, such that only brief introduction is made to the apparatus and the electronic device.

It should be noted that, in this context, relational terms such as first and second are used only to distinguish an entity from another entity or to distinguish an operation from another operation without necessarily requiring or implying that the entities or operations actually have a certain relationship or sequence. Moreover, "comprise", "include" or other variants are non-exclusive, thus a process, a method, an object or a device including a series of elements not only include such elements, but also include other elements which may not mentioned, or inherent elements of the process, method, object or device. If there is no further limitation, a feature defined by an expression of "include a . . . " does not mean the process, the method, the object or the device can only have one elements, same elements may also be included.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Those skilled in the art will be able to combine different embodiments and the features of different embodiments described in the specification. The modules or units in all embodiments of the present disclosure may be implemented by a general integrated circuit, such as a central processing unit (CPU), or by an application specific integrated circuit (ASIC).

The steps in the method of all embodiments of the present disclosure may be sequentially adjusted, combined and subtracted according to actual needs. Modules or units in the apparatus of all embodiments of the present disclosure may be combined, divided and deleted according to actual needs.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which may not follow a shown or discussed order according to the related functions in a substantially simultaneous manner or in a reverse order, to perform the function, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc. Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

Embodiments of the present disclosure are disclosed, which should not construed to limit the present disclosure. Changes may be made by those skilled in the art according to all or part of the embodiments described above and claims of the present disclosure, which are still in the scope of the present disclosure.

What is claimed is:

1. An information push method, comprising:
   acquiring a page view number of each piece of information in a predetermined information list for a predetermined period of time before a current time;
   selecting information from the predetermined information list according to the page view number, wherein the selected information is information not meeting a predetermined information displaying condition;
   acquiring an information recommendation degree of the selected information;
   determining information to be pushed from the selected information according to the information recommendation degree;
   pushing the information to be pushed;
   wherein acquiring a page view number of each piece of information in a predetermined information list for a predetermined period of time before a current time comprises:
   acquiring a page view number $PV_{ADi}$ of any information $AD_i$ in a predetermined information list for a predetermined period of time before the current time according to a formula of $$PV_{ADi}=w_1*PV_{ADi\_f1}+\ldots+w_n*PV_{ADi\_fn},$$

where $PV_{ADi\_f1}$ represents a page view number of the information $AD_i$ for a first day before the current time, $w_1$ represents an attenuation coefficient corresponding to $PV_{ADi\_f1}$, $PV_{ADi\_fn}$ represents a page view number of the information $AD_i$ for a $n^{st}$ day before the current time, $w_n$ represents an attenuation coefficient corresponding to $PV_{ADi\_fn}$, the $n^{st}$ day before the current time is a day most far from the current time which is determined according to the predetermined period of time, and values from $w_1$ to $w_n$ are decreased progressively according to a predetermined rule.

2. The method according to claim 1, wherein selecting information from the predetermined information list according to the page view number comprises:
   adjusting the page view number according to a formula of $$P'_{ADj\ 1}=(target\_pv-P_{ADj1})/target\_pv,$$

where $P_{ADj1}$ represents a page view number of the information $AD_j$, $P'_{ADj\ 1}$ represents an adjusted page view number corresponding to $P_{ADj1}$, and target_pv represents a predetermined threshold of a page view number;
   selecting information having a page view number greater than a first probability threshold and smaller than a second probability threshold from the predetermined information list.

3. The method according to claim 1, wherein determining information to be pushed in the selected information according to the information recommendation degree comprises:
   adjusting the information recommendation degree according to a formula of $$P_{ADq2}'=P_{ADq2}-P_{min})/(P_{max}-P_{min}),$$

where $P_{ADq2}$ represents an information recommendation degree of information ADq, $P'_{ADq\ 2}$ represents an adjusted information recommendation degree corresponding to $P_{ADq2}$, $P_{min}$ represents a minimal information recommendation degree in the information recommendation degrees, and $P_{max}$ represents a maximal information recommendation degree in the information recommendation degrees;
   determining information to be pushed from information having an adjusted information recommendation degree meeting a predetermined second information selecting condition of the selected information.

4. The method according to claim 3, wherein determining information to be pushed from information having an adjusted information recommendation degree meeting a second information selecting condition of the selected information comprises:
   searching for information having an adjusted information recommendation degree greater than a first recommendation degree threshold and smaller than or equal to a second recommendation degree threshold from the selected information;
   calculating a selecting weight of any found information according to a formula of $$P_{ADr}=w_{r1}*P_{ADr1}+w_{r2}*P_{ADr2},$$

where $P_{ADr}$ represents a selecting weight of information $AD_r$, $P_{ADr1}$ represents an adjusted page view number of information ADr, $P_{ADr2}$ represents an adjusted information recommendation degree of information ADr, $w_{r1}$ and $w_{r2}$ represent selecting weights of $P_{ADr1}$ and $P_{ADr2}$ respectively, and $w_{r1}+w_{r2}=1$;
   determining information to be pushed from information having a selecting weight meeting a predetermined third information selecting condition of the found information.

5. The method according to claim 4, wherein determining information to be pushed from information having a selecting weight meeting a predetermined third information selecting condition of the found information comprises:
   acquiring a random number according to a predetermined range and a predetermined random function;
   determining the information to be pushed from the information having the selecting weight meeting the predetermined third information selecting condition of the found information according to the random number.

6. The method according to claim 2, wherein determining information to be pushed in the selected information according to the information recommendation degree comprises:
   adjusting the information recommendation degree according to a formula of $$P_{ADq2}'=P_{ADq2}-P_{min})/(P_{max}-P_{min}),$$

where $P_{ADq2}$ represents an information recommendation degree of information ADq, $P'_{ADq2}$ represents an adjusted information recommendation degree corresponding to $P_{Adq2}$, $P_{min}$ represents a minimal information recommendation degree in the information recommendation degrees, and $P_{max}$ represents a maximal information recommendation degree in the information recommendation degrees;
   determining information to be pushed from information having an adjusted information recommendation degree meeting a predetermined second information selecting condition of the selected information.

7. An electronic device, comprising a housing, a processor, a memory, a circuit board and a power circuit, wherein the circuit board is disposed within a space enclosed by the housing, the processor and the memory are disposed on the circuit board, the power circuit is configured to supply power to respective circuits or components of the electronic device, the memory is configured to store an executable program code, the processor is configured to read the executable program code stored in the memory to run a program corresponding to the executable program code, so as to be configured to perform following steps:

acquiring a page view number of each piece of information in a predetermined information list for a predetermined period of time before a current time;

selecting information from the predetermined information list according to the page view number, wherein the selected information is information not meeting a predetermined information displaying condition;

acquiring an information recommendation degree of the selected information;

determining information to be pushed from the selected information according to the information recommendation degree;

pushing the information to be pushed;

wherein acquiring a page view number of each piece of information in a predetermined information list for a predetermined period of time before a current time comprises:

acquiring a page view number $PV_{ADi}$ of any information $AD_j$ in a predetermined information list for a predetermined period of time before the current time according to a formula of $$PV_{ADi}=w_1*PV_{ADi\_f1}+\ldots+w_n*PV_{ADi\_fn},$$

where $PV_{ADi\_f1}$ represents a page view number of the information $AD_i$ for a first day before the current time, $w_1$ represents an attenuation coefficient corresponding to $PV_{ADi\_f1}$, $PV_{ADi\_fn}$ represents a page view number of the information $AD_i$ for a $n^{st}$ day before the current time, $w_n$ represents an attenuation coefficient corresponding to $PV_{ADi\_fn}$, the $n^{st}$ day before the current time is a day most far from the current time which is determined according to the predetermined period of time, and values from $w_1$ to $w_n$ are decreased progressively according to a predetermined rule.

8. The electronic device according to claim 7, wherein selecting information from the predetermined information list according to the page view number comprises:

adjusting the page view number according to a formula of $$P'_{ADj\ 1}=(target\_pv-P_{ADj1})/target\_pv,$$

where $P_{ADj1}$ represents a page view number of the information $AD_i$, $P'_{ADj\ 1}$ represents an adjusted page view number corresponding to $P_{ADj1}$, and target_pv represents a predetermined threshold of a page view number;

selecting information having a page view number greater than a first probability threshold and smaller than a second probability threshold from the predetermined information list.

9. The electronic device according to claim 7, wherein determining information to be pushed in the selected information according to the information recommendation degree comprises:

adjusting the information recommendation degree according to a formula of $$P'_{ADq\ 2}=(P_{ADq2}-P_{min})/(P_{max}-P_{min}),$$

where $P_{ADq2}$ represents an information recommendation degree of information ADq, $P'_{ADq2}$ represents an adjusted information recommendation degree corresponding to $P_{ADq2}$, $P_{min}$ represents a minimal information recommendation degree in the information recommendation degrees, and $P_{max}$ represents a maximal information recommendation degree in the information recommendation degrees;

determining information to be pushed from information having an adjusted information recommendation degree meeting a predetermined second information selecting condition of the selected information.

10. The electronic device according to claim 9, wherein determining information to be pushed from information having an adjusted information recommendation degree meeting a second information selecting condition of the selected information comprises:

searching for information having an adjusted information recommendation degree greater than a first recommendation degree threshold and smaller than or equal to a second recommendation degree threshold from the selected information;

calculating a selecting weight of any found information according to a formula of $$P_{ADr}=w_{r1}*P_{ADr1}+w_{r2}*P_{ADr2},$$

where $P_{ADr}$ represents a selecting weight of information $AD_r$, $P_{ADr1}$ represents an adjusted page view number of information ADr, $P_{ADr2}$ represents an adjusted information recommendation degree of information ADr, $w_{r1}$ and $w_{r2}$ represent selecting weights of $P_{ADr1}$ and $P_{ADr2}$ respectively, and $w_{r1}\ w_{r2}=1$;

determining information to be pushed from information having a selecting weight meeting a predetermined third information selecting condition of the found information.

11. The electronic device according to claim 10, wherein determining information to be pushed from information having a selecting weight meeting a predetermined third information selecting condition of the found information comprises:

acquiring a random number according to a predetermined range and a predetermined random function;

determining the information to be pushed from the information having the selecting weight meeting the predetermined third information selecting condition of the found information according to the random number.

12. A non-transitory computer readable storage medium having stored therein instructions that, when executed by a processor of an electronic device, causes the electronic device to perform an information push method comprising:

acquiring a page view number of each piece of information in a predetermined information list for a predetermined period of time before a current time;

selecting information from the predetermined information list according to the page view number, wherein the selected information is information not meeting a predetermined information displaying condition;

acquiring an information recommendation degree of the selected information;

determining information to be pushed from the selected information according to the information recommendation degree;

pushing the information to be pushed;

wherein acquiring a page view number of each piece of information in a predetermined information list for a predetermined period of time before a current time comprises:
acquiring a page view number $PV_{ADi}$ of any information $AD_i$ in a predetermined information list for a predetermined period of time before the current time according to a formula of $$PV_{ADi}=w_1*PV_{ADi\_f1}+\ldots+w_n*PV_{ADi\_fn},$$

where $PV_{ADi\_f1}$ represents a page view number of the information $AD_i$ for a first day before the current time, $w_1$ represents an attenuation coefficient corresponding to $PV_{ADi\_f1}$, $PV_{ADi\_fn}$ represents a page view number of the information $AD_i$ for a $n^{st}$ day before the current time, $w_n$ represents an attenuation coefficient corresponding to $PV_{ADi\_fn}$, the $n^{st}$ day before the current time is a day most far from the current time which is determined according to the predetermined period of time, and values from $w_1$ to $w_n$ are decreased progressively according to a predetermined rule.

13. The non-transitory computer readable storage medium according to claim 12, wherein selecting information from the predetermined information list according to the page view number comprises:
adjusting the page view number according to a formula of $$P'_{ADj,1}=(target\_pv-P_{ADj1})/target\_pv,$$

where $P_{ADj1}$ represents a page view number of the information $AD_j$, $P'_{ADj,1}$ represents an adjusted page view number corresponding to $P_{ADj1}$, and target_pv represents a predetermined threshold of a page view number;
selecting information having a page view number greater than a first probability threshold and smaller than a second probability threshold from the predetermined information list.

14. The non-transitory computer readable storage medium according to claim 12, wherein determining information to be pushed in the selected information according to the information recommendation degree comprises:
adjusting the information recommendation degree according to a formula of $$P'_{ADq2}(P_{ADq2}-P_{min})/(P_{max}-P_{min}),$$

where $P_{ADq2}$ represents an information recommendation degree of information $AD_q$, $P'_{ADq\_2}$ represents an adjusted information recommendation degree corresponding to $P_{ADq2}$, $P_{min}$ represents a minimal information recommendation degree in the information recommendation degrees, and $P_{max}$ represents a maximal information recommendation degree in the information recommendation degrees;
determining information to be pushed from information having an adjusted information recommendation degree meeting a predetermined second information selecting condition of the selected information.

15. The non-transitory computer readable storage medium according to claim 14, wherein determining information to be pushed from information having an adjusted information recommendation degree meeting a second information selecting condition of the selected information comprises:
searching for information having an adjusted information recommendation degree greater than a first recommendation degree threshold and smaller than or equal to a second recommendation degree threshold from the selected information;
calculating a selecting weight of any found information according to a formula of $$P_{ADr}=w_{r1}*P_{ADr1}+w_{r2}*P_{ADr2},$$

where $P_{ADr}$ represents a selecting weight of information $AD_r$, $P_{ADr1}$ represents an adjusted page view number of information ADr, $P_{ADr2}$ represents an adjusted information recommendation degree of information ADr, $w_{r1}$ and $w_{r2}$ represent selecting weights of $P_{ADr1}$ and $P_{ADr2}$ respectively, and $w_{r1}$ $w_{r2}=1$;
determining information to be pushed from information having a selecting weight meeting a predetermined third information selecting condition of the found information.

16. The non-transitory computer readable storage medium according to claim 15, wherein determining information to be pushed from information having a selecting weight meeting a predetermined third information selecting condition of the found information comprises:
acquiring a random number according to a predetermined range and a predetermined random function;
determining the information to be pushed from the information having the selecting weight meeting the predetermined third information selecting condition of the found information according to the random number.

* * * * *